United States Patent
Wang et al.

(10) Patent No.: US 10,913,227 B2
(45) Date of Patent: Feb. 9, 2021

(54) FRAME STRUCTURE, METHOD FOR MANUFACTURING THE SAME AND DEVICE

(71) Applicant: BOE TECHNOLOGY GROUP CO., LTD., Beijing (CN)

(72) Inventors: Zifeng Wang, Beijing (CN); Yan Ren, Beijing (CN); Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 15/983,185

(22) Filed: May 18, 2018

(65) Prior Publication Data
US 2019/0111643 A1    Apr. 18, 2019

(30) Foreign Application Priority Data
Oct. 13, 2017    (CN) .......................... 2017 1 0954067

(51) Int. Cl.
*B29D 12/00*    (2006.01)
*E06B 3/20*    (2006.01)

(52) U.S. Cl.
CPC .............. *B29D 12/00* (2013.01); *E06B 3/20* (2013.01)

(58) Field of Classification Search
CPC ........ B29D 12/00; E06B 3/20; E06B 3/26347
See application file for complete search history.

(56) References Cited

U.S. PATENT DOCUMENTS

2010/0275537 A1* 11/2010 Valentz ............... E04D 13/0305
    52/200

FOREIGN PATENT DOCUMENTS

| CN | 1635427 A | 7/2005 |
|---|---|---|
| CN | 101328750 A | 12/2008 |
| CN | 202136049 U | 2/2012 |
| CN | 203701572 * | 7/2014 |
| CN | 206323696 U | 7/2017 |
| CN | 107149354 A | 9/2017 |

OTHER PUBLICATIONS

First Office Action for Chinese Patent Application No. 201710954067.2 dated Jan. 28, 2019.

* cited by examiner

*Primary Examiner* — Yan Lan
(74) *Attorney, Agent, or Firm* — Calfee, Halter & Griswold LLP (57) ABSTRACT

A frame structure, a method for manufacturing the same and a device is provided. The frame structure includes at least one frame bar, an injection cavity and a plastic material; the injection cavity is located in an interior of the frame bar and extends in a length direction of the frame bar, and the plastic material is filled in the injection cavity, wherein an expansion coefficient of the plastic material is lower than an expansion coefficient of the material from which the frame bar is made.

12 Claims, 4 Drawing Sheets

FRAME STRUCTURE, METHOD FOR MANUFACTURING THE SAME AND DEVICE

CROSS REFERENCE TO RELATED APPLICATIONS

This application claims the priority to and the benefit of Chinese Patent Application No. 201710954067.2, filed on Oct. 13, 2017, which is incorporated herein by reference in its entirety.

TECHNICAL FIELD

The present disclosure relates to a frame structure, a method for manufacturing the same and a device.

BACKGROUND

A frame structure is widely used. Materials of the frame structure are defined in order to ensure special performance of the frame structure, but if an expansion coefficient of these materials is greater, the frame structure tends to be subjected to fierce expansion or contract when a water and oxygen environment, a temperature environment, and the like change, which results the frame structure to be damaged.

SUMMARY

According to one aspect of the present disclosure, a frame structure is provided, which includes at least one frame bar, an injection cavity and a plastic material; the injection cavity is located in an interior of the frame bar and extends in a length direction of the frame bar, and the plastic material is filled in the injection cavity, wherein an expansion coefficient of the plastic material is lower than an expansion coefficient of the material from which the frame bar is made.

In some embodiments of the present disclosure, the expansion coefficient includes at least one of a moisture expansion coefficient, a thermal expansion coefficient, and a volume expansion coefficient.

In some embodiments of the present disclosure, at least in one local area, a cross-section perpendicular to an extending direction of the injection cavity is non-uniform.

In some embodiments of the present disclosure, the injection cavity includes a plurality of connection cavities; and a plurality of node cavities, each of which connects the connection cavities adjacent to each other, wherein a cross-section of the node cavity is larger than a cross-section of the connection cavity.

In some embodiments of the present disclosure, the node cavity is provided with an injection hole having an opening direction intersected with the extending direction of the injection cavity.

In some embodiments of the present disclosure, the frame structure further includes a screw that is connected with the frame bar through the node cavity along the injection hole.

In some embodiments of the present disclosure, the plastic material includes polycarbonate.

In some embodiments of the present disclosure, a surface of the injection cavity is covered with a smoothing agent.

In some embodiments of the present disclosure, there are a plurality of injection cavities which are distributed in parallel with the frame bar at interval.

According to one aspect of the present disclosure, there is provided a method for manufacturing the frame structure, including:

forming an injection cavity extending in a length direction of the frame bar in an interior of the frame bar;

injecting a plastic material into the injection cavity, an expansion coefficient of the plastic material being lower than an expansion coefficient of the material from which the frame bar is made; and forming the frame bar into the frame structure.

In some embodiments of the present disclosure, forming the injection cavity extending along the length direction of the frame bar in the frame bar includes:

at least in one local area, forming a cross-section perpendicular to an extending direction of the injection cavity into a non-uniform structure.

In some embodiments of the present disclosure, the at least in one local area, forming the cross-section perpendicular to the extending direction of the injection cavity into the non-uniform structure includes:

forming a through hole extending in a length direction of the frame bar; and forming a plurality of node cavities with increasing cross-section in the through hole, a portion of the through hole located between the node cavities adjacent to each other is a connection cavity.

In some embodiments of the present disclosure, the method further includes performing smooth processing to the injection cavity after forming the injection cavity extending the length direction of the frame bar in the interior of the frame bar.

In some embodiments of the present disclosure, performing smooth processing to the injection cavity includes:

grinding the injection cavity; and applying a smoothing agent onto the injection cavity.

In some embodiments of the present disclosure, the method further includes:

maintaining pressure of an outer surface of the frame bar prior to injecting the plastic material into the injection cavity.

In some embodiments of the present disclosure, injecting the plastic material into the injection cavity includes:

forming an injection hole having an opening direction intersected with the extending direction of the injection cavity on the node cavity, and injecting the injection cavity through the injection hole.

In some embodiments of the present disclosure, the method further includes:

trimming for a cross-section of the frame bar and chamfering for edge of the frame bar after injecting the plastic material into the injection cavity.

According to one aspect of the present disclosure, there is provided a device including a display panel, the display panel having a frame structure according to the above embodiment.

It should be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are incorporated in and constitute a part of the present description, illustrate embodiments of the present disclosure and together with the description serve to explain the principle of the present

DETAILED DESCRIPTION

Now, the exemplary embodiments will be described more fully with reference to the accompany drawings. However, the exemplary embodiments can be implemented in various forms and should not be construed as limited to the embodiments set forth herein. Instead, these embodiments are provided so that this disclosure will be thorough and complete, and the concept of the exemplary embodiment will fully convey to those skilled in the art. Same reference signs denote the same or similar structures in the accompany drawings, and thus the detailed description thereof will be omitted.

The relativity words, such as "upper" or "lower", as used herein, are used to describe the relative relationship of the referenced component to another component. These words are used herein for convenience only, for example, according to the direction of the illustrative examples as shown in the figures. It is appreciated that if the referenced device is inversed upside down, the component indicated as being the "upper" side would become the component on the "lower" side. Other relative terms, such as "high", "low", "top", "bottom", "left" and "right" have similar meanings. When one structure is "on" another structure, it is possible to indicate that the one structure is integrally formed on the other structure, or the one structure is "directly" arranged on the other structure, or one structure is "indirectly" formed on the other structure by means of a further structure.

The terms "a", "an", "the", "said" and "at least one", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like.

According to technique as known by the inventor, in order to avoid expansion and contraction of a frame structure, it is possible to apply an insulating material on the surface of the material forming the frame structure, for example, paint is applied onto the outer surface of the material to isolate the material from air so as to avoid the material from being expanded due to moisture absorption or contracted due to drying. However, applying the insulating materials may damage the original surface feature of the material to affect its appearance. In addition, the insulating materials applied onto the outer surface will be easily damaged by the external force, thereby losing an effect of moisture barrier.

Figure 1:
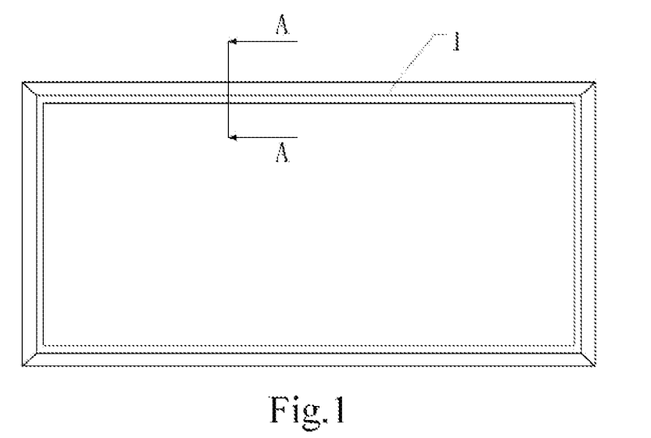
FIG. 1 is a schematic view of a frame structure according to some embodiments of the present disclosure.
Figure 2:
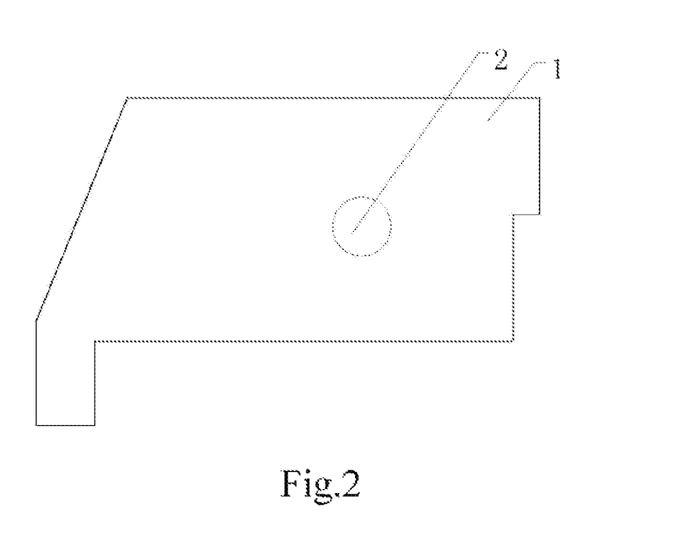
FIG. 2 is a sectional view taken along A-A in FIG. 1.

At least one embodiment of the present disclosure provides a frame structure. Referring to FIG. 1 and FIG. 2, FIG. 1 is a schematic view of the frame structure according to some embodiments of the present disclosure, and FIG. 2 is a sectional view taken along A-A in FIG. 1. The frame structure includes at least one frame bar 1, an injection cavity 2 and a plastic material. The injection cavity 2 is located in an interior of the frame bar and extends along a length direction of the frame bar. The plastic material is filled in the injection cavity 2, wherein an expansion coefficient of the plastic material is lower than an expansion coefficient of the material from which the frame bar is made.

In some embodiments of the present disclosure, the so-called expansion coefficient, for example, may be a moisture expansion coefficient, for example, may be a thermal expansion coefficient, for example, may be a volume expansion coefficient.

According to environment in which the frame structure is existed, a plastic material having a corresponding expansion coefficient can be selected. For example, if the frame structure is mainly used in a wet environment, it may be selected that the moisture expansion coefficient of the plastic material is lower than the moisture expansion coefficient of the material from which the frame bar is made; for example, if the frame structure may be mainly used in the environment where the temperature frequently changes, it may be selected that the thermal expansion coefficient of the plastic material is lower than the thermal expansion coefficient of the material from which the frame bar is made; for example, if the frame structure is mainly used in an environment that subjects to external pressure, it may be selected that the volume expansion coefficient of the plastic material is lower than the volume expansion coefficient of the material from which the frame bar is made.

In some embodiments of the present disclosure, based on the commonly used environments of the frame structure according to the present disclosure, it is generally selected that the moisture expansion coefficient of the plastic material is lower than the moisture expansion coefficient of the material from which the frame bar is made.

According to the frame structure provided by an embodiment of the present disclosure, the expansion coefficient of the plastic material is lower than the expansion coefficient of the material from which a frame bar 1 is made. When physical conditions of the environment in which the frame structure is existed change, the plastic material can resist expansion and contraction of the frame bar 1, to avoid deforming and damaging the frame structure. Compared with the related art, on the one hand, an outer surface of the frame structure cannot be affected and maintains the original form, thereby improving the overall appearance of the frame; on the other hand, the plastic material is located in the interior of the frame bar and cannot be easily damaged by external force, and thereby the service life of the frame structure is longer.

The frame structure may consist of four frame bars 1 that are selected as straight frame bars. The frame structure is simple in design and easy to install.

It should be appreciated for the person skilled in the art that the frame structure and the frame bar still have many more structures to be selected and implemented. For example, the number of frame bar may be other numbers, and the frame bar may have a curved shape or an irregular shape such as circle, fan, etc. These variations should be understood as belonging to the protection scope of the present disclosure.

The frame structure according to embodiments of the present disclosure may be formed in many manners, for example, the frame structure may be formed by splicing through a plurality of frame bars 1, for example, the frame structure may be integrally formed by a process such as squeezing and 3D printing. These variations should be understood as belonging to the protection scope of the present disclosure.

In this exemplary embodiment, the injection cavity 2 may be a straight hole extending along the length of the straight frame bar within the straight frame bar. The structure of the straight hole may be drilled easily by an operator. The plastic material in the corresponding shape may be formed in the straight hole, and bonding force between the plastic material and the frame bar can resist the expansion and contraction of the frame bar due to variation of the humidity.

In some embodiments, the injection cavity 2 can be designed to have a curved or bent shape. The plastic material may form a solid structure with the corresponding shape in a bent or curved hole. The expansion and contraction of the frame bar would change the original shape of the plastic material, while stress of the plastic material itself can resist the expansion and contraction of the frame bar.

In some embodiments, the plastic material may be injected into the injection cavity 2 in a fluidic form, and solidified to form a solid adhered to the injection hole.

In some embodiments, the plastic material may be directly adhered to the injection hole in a solid form.

In some embodiments, the plastic material may include polycarbonate, which has a high strength characteristic and a good resistance to temperature and humidity, and thereby can greatly limit the expansion and contraction of the frame bar. The material of the plastic material is not limited thereto, other material, such as Polycarbonate—polystyrene blends, nylon (PA6, PA66, etc.), may also be adopted for the disclosure.

In some embodiments, the frame bar 1 may be a wooden structure, a metal structure, a plastic structure, or the like, and can be used as a frame of a display panel, such as an electronic picture frame, a display, and the like. In some electronic picture frames, in order to keep the electronic picture frames in consistence with the picture frames in a paining gallery in style, the original metal or plastic casing of the electronic picture frame may be changed into a wooden frame, and preserve unique texture of the wood. However, the moisture expansion coefficient of wood materials is relatively large, the expansion and contraction easily occurs during humidity variations, thereby destroying the picture frame and its internal circuit structure. The frame structure of this embodiment in the present disclosure can prevent frame bar from being deformed due to expansion and contraction under the condition that the texture of the outer surface of the wood frame is not damaged. In addition, the frame bar can also be made from other materials, and used in different technical fields. It should be understood that these all are within the protection scope of the present disclosure.

In some embodiments, the injection cavity 2 is in the form of a straight hole. When the injection cavity 2 is a straight hole, the plastic material relies on the bonding force with the injection cavity 2 to resist the expansion and contraction of the frame bar 1. When the internal stress that causes expansion and contraction of the frame bar 1 is greater, the plastic material is easily misaligned with injection cavity 2, which would affect the resistance by the plastic material against the expansion and contraction of the frame bar 1.

In some embodiments, at least in one local area, the cross-section perpendicular to an extending direction of the injection cavity 2 is non-uniform.

The cross-section described herein being non-uniform refers to at least in one local area, if the cross-section perpendicular to the extending direction of the injection cavity 2 is selected, at least two different areas or shapes can be obtained.

It should be noted that the frame bar mainly expands and contracts in its length direction. When the cross-section perpendicular to the extending direction of the injection cavity 2 has a non-uniform area or shape, the cross-section of the plastic material formed in the injection cavity 2, perpendicular to the extending direction of the injection cavity 2, is also varied in the length direction of the frame bar. Therefore, the plastic material is not easily misaligned with injection cavity 2 when frame bar 1 undergoes expansion and contraction in the length direction.

Figure 3:
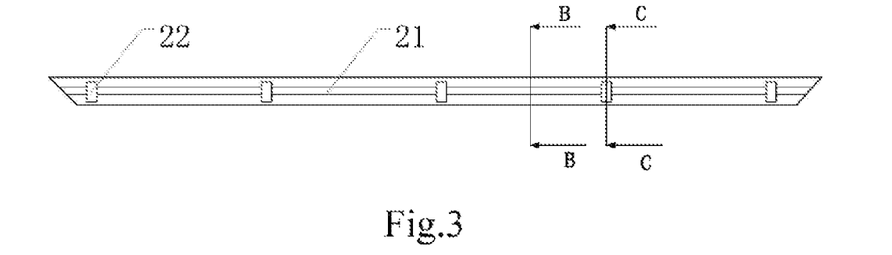
FIG. 3 is an axial sectional view of the frame according to some embodiments of the present disclosure.
Figure 4:
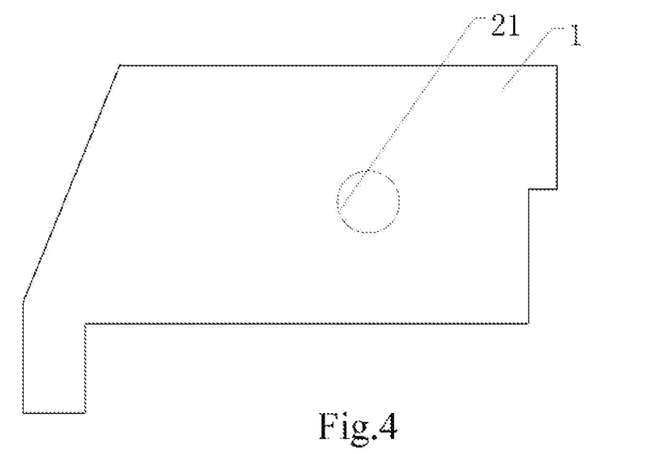
FIG. 4 is a sectional view taken along B-B in FIG. 3.
Figure 5:
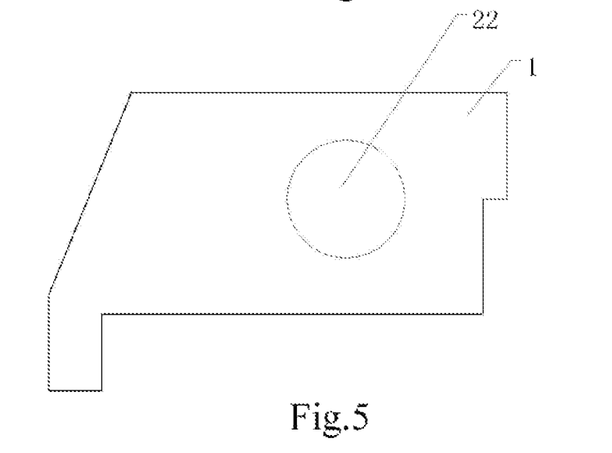
FIG. 5 is a sectional view taken along C-C in FIG. 3.

In some embodiments, at least in one local area, the cross-section of the injection cavity 2 perpendicular to the extending direction thereof is non-uniform, which could be implemented as shown in FIG. 3, FIG. 4 and FIG. 5. FIG. 3 is a side view of a frame bar according to some embodiments of the present disclosure. FIG. 4 is a sectional view taken along B-B in FIG. 3. FIG. 5 is a sectional view taken along C-C in FIG. 3. The injection cavity 2 includes a plurality of connection cavities 21 and a plurality of node cavities 22. The node cavity 22 connects two connection cavities 21 adjacent to each other, wherein the cross-section of the node cavity 22 is larger than the cross-section of the connection cavity 21.

The plastic material forms a raised structure with an increasing cross-section at the node cavity 22. the frame bar between adjacent raised structures is clamped between the plastic materials to avoid misalignment of the plastic material with the frame bar 1, so as to resist the expansion and contraction of frame bar 1 in the length direction. Wherein the larger a density distribution of the node cavity 22 is, the more obvious the effect of resisting the expansion and contraction of the frame. It should be understood by the person skilled in the art that there are many further forms selectively implemented to form "the non-uniform cross-section" as above mentioned, which all fall within the protection scope of the present disclosure.

In some embodiments, the plastic material is injected into the injection cavity 2 in a fluidic state, the plastic material will be rapidly solidified in a main injection cavity, so that the plastic material needs to fill the main injection cavity within a predetermined time. However, since the frame bar is longer, a plurality of injection holes are required simultaneously.

Figure 6:
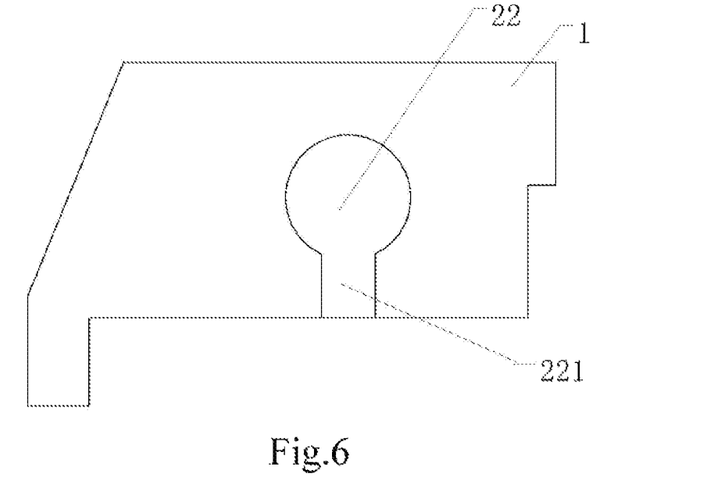
FIG. 6 is a sectional view of a node cavity of the frame bar according to some embodiments of the present disclosure.

In some embodiments, as shown in FIG. 6, which is a cross-section view at the node cavity of the frame bar, the node cavity 22 may be provided with a plurality of injection holes 221. An opening direction of the injection hole 221 may intersect with the extending direction of the injection cavity 2. The opening of the injection hole 221 is located on the frame bar and can simultaneously inject the plastic materials into the injection cavity 2 through the plurality of injection holes 221.

The injection hole 221 is disposed on the node cavity 22, which can achieve an effect of simultaneous injection into the plurality of the injection holes, and can avoid occurrence of such problem that the flow speed is too slow due to too large local resistance of the node cavity 22 when the plastic material flows through the node cavity 22. It should be understood by the person skilled in the art that there are many further forms to arrange "a plurality of the injection holes" as above mentioned to be selectively implemented, which all fall within the protection scope of the present disclosure.

Figure 7:
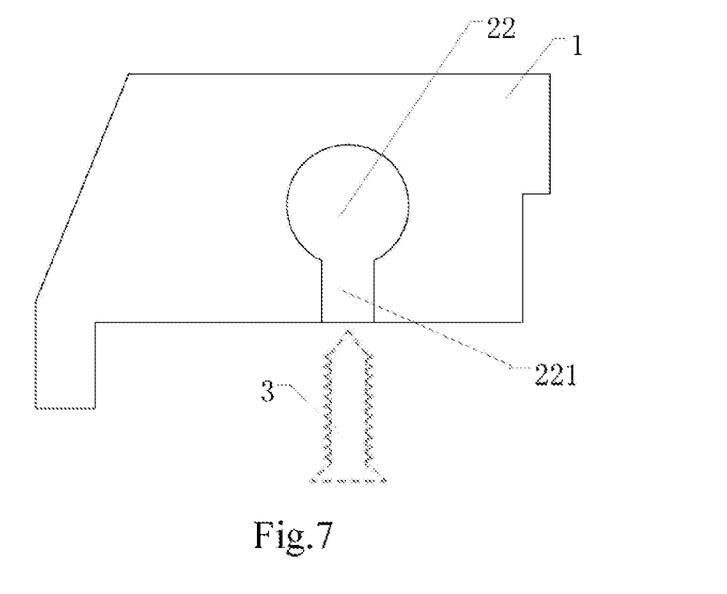
FIG. 7 is a schematic view of a structure at an injection hole according to some embodiments of the present disclosure.

In some embodiments, as shown in FIG. 7, which is a schematic view of a structure at the injection hole. The frame structure may also include a screw 3 that is connected to the frame bar through the node cavity 22 along the injection hole 221.

The screw 3 is inserted through the node cavity 22 along the injection hole 22, such that the plastic material in the node cavity 22 can support the node cavity 22 more compactly, to prevent a gap from being preserved between the plastic material and the node cavity 22, so as to avoid misalignment of the plastic material and the injection cavity due to the preserved gap, and thereby improving the effect of the plastic material resisting the expansion and contraction of the frame bar. Connecting the screw 3 to the frame bar can further avoid the misalignment between the plastic material and the injection cavity.

The injection cavity 2 is formed by punching, and the surface of the injection cavity 2 formed by punching is rough, which may affect flowing for the plastic material within the injection cavity 2. In some embodiments, the surface of the injection cavity 2, for example the inner surface, may be covered with a smoothing agent. For example, the smoothing agent may be selected from paint and other materials.

The smoothing agent is used to increase smoothness of the injection cavity, which facilitates the plastic material rapidly flowing within the injection cavity.

When the cross-section area perpendicular to the length direction of the frame bar 1 is larger, one injection cavity is arranged only to resist the expansion and contraction of a part of the frame bar 1. In some embodiments, the injection cavity 2 may be in plural, for example, a plurality of the injection cavities 2 may be distributed in parallel within the frame bar at interval.

The plurality of injection cavities 2 can be evenly distributed on the cross-section perpendicular to the length direction of the frame bar 1. The plastic materials in the plurality of the injection cavities can take an action simultaneously, and can resist the expansion and contraction of frame bar 1 as a whole.

Figure 8:
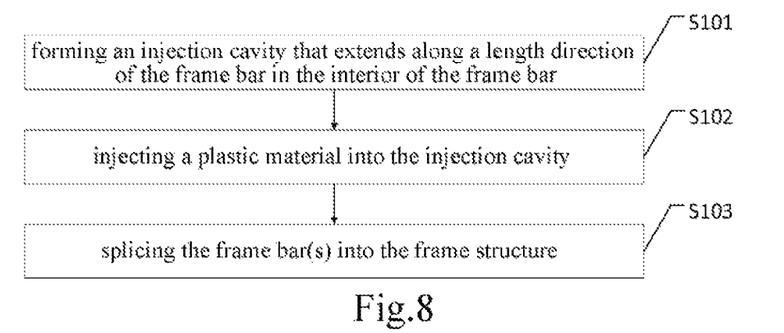
FIG. 8 is a flow chart of a method for manufacturing the frame structure according to some embodiments of the present disclosure.

At least one embodiment of the present disclosure further provides a method for manufacturing a frame structure. As shown in FIG. 8, the method includes:

step S101: forming an injection cavity that extends along a length direction of the frame bar in the interior of the frame bar;

step S102: injecting a plastic material into the injection cavity, wherein the expansion coefficient of the plastic material is lower than the expansion coefficient of the material for making the frame bar;

step S103: forming the frame bar into the frame structure.

In some embodiments, in the step S101, the injection cavity may be formed by many manners, such as formed by punching, or may be formed by quickly drilling via a drilling machine. The injection cavity may also be a curved or bent hole. The functional principle of the injection cavity has been described in detail in the foresaid embodiment of the frame structure, which herein will not be described anymore.

In some embodiments, in the step S101, forming an injection cavity that extends along the length direction of the frame bar in the interior of the frame bar may include forming the cross-section perpendicular to the extending direction of the injection cavity into a non-uniform structure, at least in one local area. The function principle and object of such method have been described in detail in the above-mentioned frame structure, and thereby will not be described herein.

In some embodiments, at least in one local area, forming the cross-section perpendicular to the extending direction of the injection cavity into a non-uniform structure may include forming a through hole extending in a length direction in the frame bar. A plurality of node cavities with increasing cross-section is formed in the through hole. A portion of the through hole located between the node cavities adjacent to each other is a connection cavity.

In some embodiments, the through hole extending in the length direction of the frame bar is formed in the frame bar by means of a drilling machine, and then a node cavity is formed as a result of secondary hole expansion at a specific position of the through hole by using the drilling machine, thereby the through hole between the node cavities is the connection cavity. The function principle and object of such structure have been described in detail in the foresaid embodiments of the frame structure described above, and will not be described herein.

In some embodiments, in the step S102, forming an injection hole with an opening direction that intersects with the extending direction of the injection cavity on the node cavity, and injecting the injection cavity through the injection hole.

In some embodiments, the injection hole can be drilled by electric drill. The plastic material can be injected through an injector, and can be rapidly pressed into the injection hole under pressure of the injector. When the plastic material is injected, at least one injection hole can be separately arranged between the injection holes connected to the injector, such that air in the injection cavity can be discharged through the injection hole separately arranged between the injection holes, to facilitate the plastic material for rapidly filling the entire injection cavity.

Figure 9:
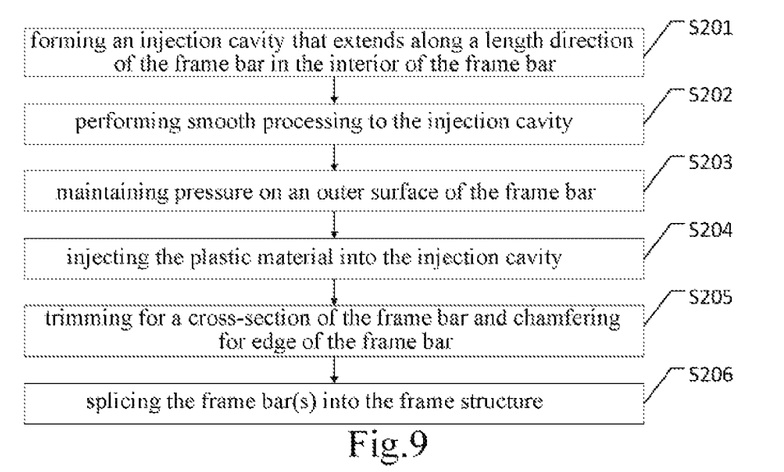
FIG. 9 is a flow chart of a method for manufacturing the frame structure according to some embodiments of the present disclosure.

In some embodiments, as shown in FIG. 9, the method for manufacturing the frame structure further includes:

step S202: performing smooth processing to the injection cavity;

step S203: maintaining pressure on an outer surface of the frame bar; and step S205: performing trimming for the cross-section of the frame bar and chamfering for edge of the frame bar.

In some embodiments, in the step S202, performing smooth processing to the injection cavity may include polishing the injection cavity, and then coating a smoothing agent onto the injection cavity.

The injection cavity is drilled by an electric drill, and the surface of the injection cavity is rough, thereby it is not favorable for filling the plastic material. In some embodiments, after the injection cavity is drilled, the surface of the injection cavity can be polished with a grinder to increase smoothness of the surface of the injection cavity. In some embodiments, the smoothing agent can be coated to the polished surface of the injection cavity in order to further enhance the smoothness of the surface of the injection cavity.

In some embodiments, in order to allow the plastic material to quickly fill up the injection cavity, therefore, the injector generally bears greater working pressure, and accordingly impact pressure of the plastic material against the interior of the frame bar also becomes relatively greater, and the frame bar is easily damaged under the impact pressure of the plastic material. The above problems would be at least partly avoided by the step S203 of maintaining the pressure on the outer surface of the frame bar can be adopted.

For example, a step of maintaining pressure on the outer surface of the frame bar includes: the outer surface of the frame bar is wrapped by using a grinding tool, such as a metal mold, but only leaving the portion of the injection hole in communication with the outside. It is certain that the grinding tool is configured such that the outer surface of the frame bar cannot be deformed under the impact pressure of the plastic material, thereby avoiding damage of the frame bar.

It should be appreciated that that there are other technical means to achieve "maintaining pressure on the outer surface of the frame bar" as above mentioned, which all fall within the protection scope of the present disclosure.

In some embodiments, as maintaining the pressure on the outer surface of the frame bar, in order to avoid complex grinding structure, a wide strip with a rectangular cross-section may be injected by the plastic material. Then trimming and angle chamfering of the cross-section of the frame bar in the step S205 can be performed.

Figure 10:
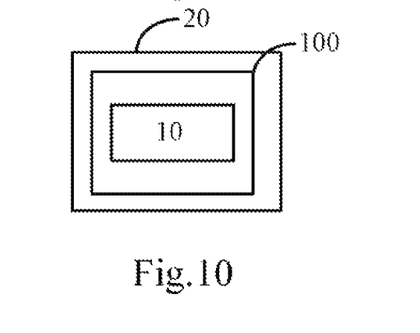
FIG. 10 is a schematic view of a display device according to some embodiments of the present disclosure.

The present disclosure further provides a device, such as display device 100, as shown in FIG. 10, the frame structure 10 according to above any embodiment is used as a frame of a display panel 20 of the display device 100.

It can be known from the above technical solution that the frame structure of the present disclosure at least partly has effects as follows:

When conditions such as humidity and temperature very, the expansion and contraction of the frame bar caused due to variation of the environmental conditions, such as humidity and temperature can be resisted by selecting the plastic material having corresponding physical characteristics, to avoid deformation of the frame structure. Compared with the related art, on one hand, an outer surface of the frame structure cannot be affected and may maintain its original position, and thereby improving the overall appearance of the frame; on the other hand, the plastic material is located in the interior of the frame bar and cannot be easily damaged by external force, and thereby the service life of the frame structure is longer.

The person skilled in the art, after consideration of the description and practice, would easily think of other embodiments of the present disclosure. The present disclosure is directed to cover any variation, use, or adaptive modification, which all comply with the general principle of the present disclosure and include common sense or the customary means in the art. The description and embodiments are merely considered as exemplary examples, and the real scope and spirit of the present disclosure are determined by the appended claims.

The foresaid features, structures, or characteristics may be combined in one or more embodiments in any suitable manner, if possible, the characteristics as discussed in each of the embodiments may be interchangeable. Numerous specific details as above described are provided for fully understanding the embodiments of the present disclosure. However, it will be acknowledged for the person skilled in the art that the technical solutions of the present disclosure practiced without one or more of the specific details, or by using other methods, components, materials, etc. may be employed. In other instances, well-known structures, materials, or operations are not shown or described in detail to avoid obscuring various aspects of the present disclosure.

What is claimed is:

1. A frame structure, comprising:
   at least one frame bar;
   an injection cavity that is located in an interior of the frame bar and extends in a length direction of the frame bar; and
   a plastic material filled in the injection cavity;
   wherein an expansion coefficient of the plastic material is lower than an expansion coefficient of a material from which the frame bar is made,
   wherein at least in one local area, a cross-section perpendicular to an extending direction of the injection cavity is non-uniform;
   wherein the injection cavity comprises:
      a plurality of connection cavities; and
      a plurality of node cavities, each connecting the connection cavities adjacent to each other, wherein a cross-section of each node cavity is larger than a cross-section of the connection cavity;
   wherein the node cavity is provided with an injection hole having an opening direction intersected with extending direction of the injection cavity.

2. The frame structure according to claim 1, wherein the expansion coefficient comprises at least one of a moisture expansion coefficient, a thermal expansion coefficient, and a volume expansion coefficient.

3. The frame structure according to claim 1, further comprising:
   a screw connected with the frame bar through the node cavity along the injection hole.

4. The frame structure according to claim 1, wherein the plastic material comprises polycarbonate.

5. The frame structure according to claim 1, wherein a surface of the injection cavity is covered with a smoothing agent.

6. The frame structure according to claim 1, wherein there are a plurality of injection cavities that are distributed in parallel with the frame bar at interval.

7. A device, comprising a display panel, the display panel having a frame structure according to claim 1.

8. A method for manufacturing the frame structure according to claim 1, comprising
   forming an injection cavity extending in a length direction of the frame bar in an interior of the frame bar;
   injecting a plastic material into the injection cavity, an expansion coefficient of the plastic material being lower than an expansion coefficient of the material from which the frame bar is made; and
   forming the frame bar into the frame structure,
   wherein the step of forming the injection cavity extending along the length direction of the frame bar in the frame bar comprises:
   at least in one local area, forming a cross-section perpendicular to an extending direction of the injection cavity into a non-uniform structure;
   wherein the step of at least in one local area, forming the cross-section perpendicular to the extending direction of the injection cavity into the non-uniform structure comprises:
   forming a through hole extending in a length direction of the frame bar; and forming a plurality of node cavities with increasing cross-section in the through hole, a portion of the through hole located between the node cavities adjacent to each other is a connection cavity;

wherein the step of injecting the plastic material into the injection cavity comprises:

forming an injection hole having an opening direction intersected with the extending direction of the injection cavity on the node cavity, and injecting the injection cavity through the injection hole.

9. The method for manufacturing the frame structure according to claim 8, further comprising performing smooth processing to the injection cavity after forming the injection cavity extending the length direction of the frame bar in the interior of the frame bar.

10. The method for manufacturing the frame structure according to claim 9, wherein the step of performing smooth processing to the injection cavity comprises:

grinding the injection cavity; and applying a smoothing agent onto the injection cavity.

11. The method for manufacturing the frame structure according to claim 8, further comprising:

maintaining pressure of an outer surface of the frame bar prior to injecting the plastic material into the injection cavity.

12. The method for manufacturing the frame structure according to claim 8, further comprising:

trimming for a cross-section of the frame bar and chamfering for edge of the frame bar after injecting the plastic material into the injection cavity.

* * * * *